United States Patent
Anderson et al.

(10) Patent No.: US 9,179,593 B2
(45) Date of Patent: Nov. 10, 2015

(54) ROW UNIT OF AN AGRICULTURAL IMPLEMENT WITH MULTIPLE LOCATIONS FOR MOUNTING A GAUGE WHEEL

(71) Applicant: CNH America LLC, New Holland, PA (US)

(72) Inventors: Brian J. Anderson, Yorkville, IL (US); Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/737,562

(22) Filed: Jan. 9, 2013

(65) Prior Publication Data

US 2014/0190374 A1    Jul. 10, 2014

(51) Int. Cl.
*A01C 5/06* (2006.01)

(52) U.S. Cl.
CPC ...................................... *A01C 5/064* (2013.01)

(58) Field of Classification Search
CPC .......... A01C 5/064; A01C 5/062; A01C 5/06; A01C 5/00
USPC .......... 111/134–137, 62, 59, 52, 14, 190–196
See application file for complete search history.

(56) References Cited

U.S. PATENT DOCUMENTS

| | | | |
|---|---|---|---|
| 632,389 | A | 9/1899 | Wilbur |
| 2,426,529 | A | 8/1947 | Silver |
| 2,884,080 | A | 4/1959 | Reaves |
| 3,052,306 | A | 9/1962 | Lynch |
| 4,356,780 | A | 11/1982 | Bauman |
| 5,235,922 | A | 8/1993 | Deckler |
| 7,946,232 | B2 | 5/2011 | Patwardhan et al. |
| 2010/0084149 | A1 | 4/2010 | Kovach et al. |

FOREIGN PATENT DOCUMENTS

WO    2008022373 A1    2/2008

*Primary Examiner* — Christopher J Novosad
(74) *Attorney, Agent, or Firm* — Rebecca L. Henkel

(57) ABSTRACT

One row unit for an agricultural implement includes a frame assembly having a front gauge wheel mounting location and a rear gauge wheel mounting location, wherein the front gauge wheel mounting location is forward of the rear gauge wheel mounting location, relative to a direction of travel of the row unit. A first gauge wheel assembly is configured to be mounted to a selected one of the front gauge wheel mounting location and the rear gauge wheel mounting location.

14 Claims, 5 Drawing Sheets

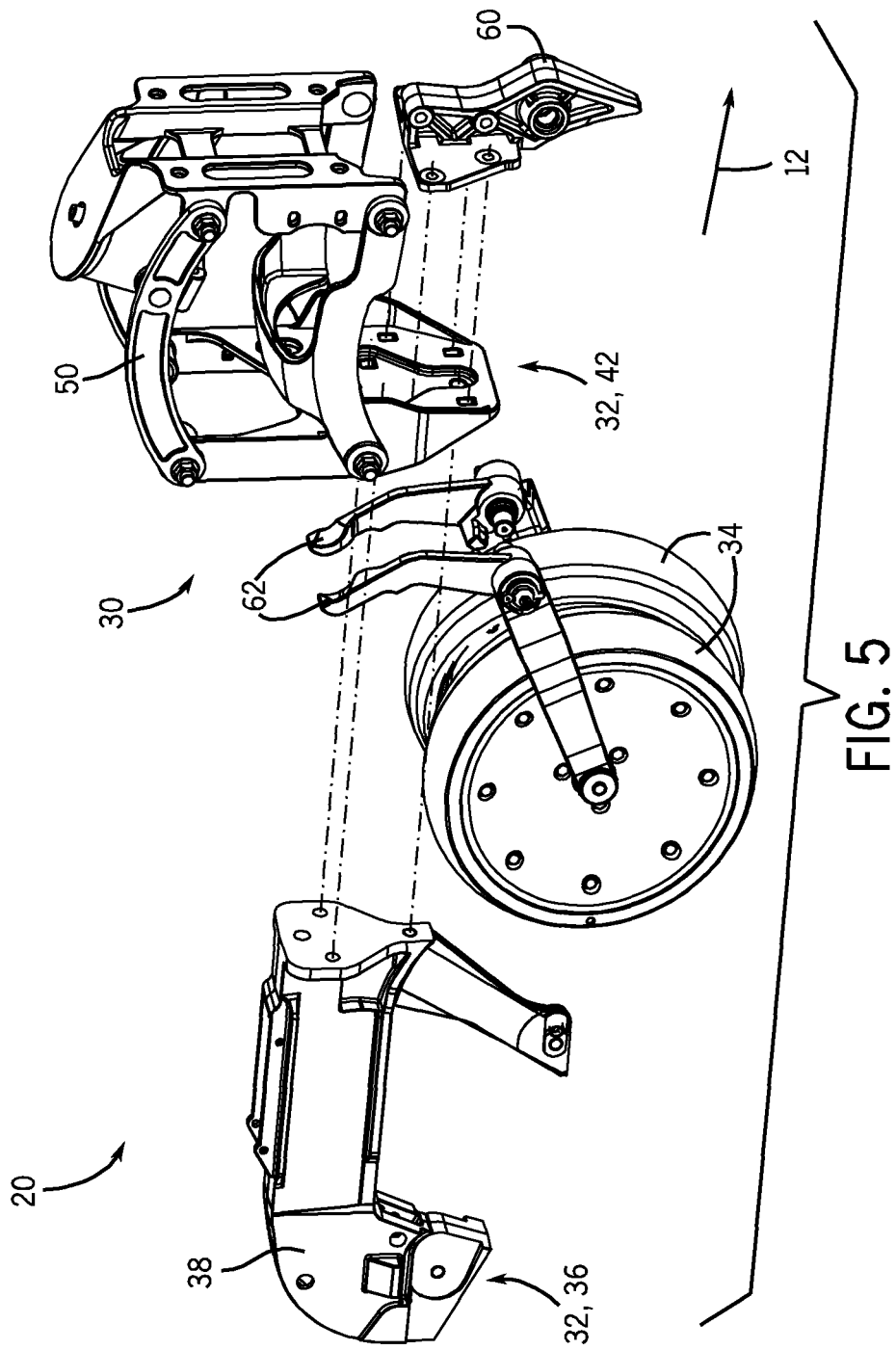

ROW UNIT OF AN AGRICULTURAL IMPLEMENT WITH MULTIPLE LOCATIONS FOR MOUNTING A GAUGE WHEEL

BACKGROUND

The invention relates generally to ground working equipment, such as an agricultural implement, and more specifically, to a row unit of an agricultural implement with multiple locations for mounting a gauge wheel.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Farming practices, soil types, and soil conditions may vary greatly throughout geographical regions in which planters are used to plant various crops. Planters are often designed for a specific set of planting conditions and may not accommodate such variability in planting conditions. For example, typical row units provide fixed locations for tools, thereby limiting the adaptability of the row unit.

BRIEF DESCRIPTION

In one embodiment, a row unit for an agricultural implement includes a frame assembly having a front gauge wheel mounting location and a rear gauge wheel mounting location, wherein the front gauge wheel mounting location is forward of the rear gauge wheel mounting location, relative to a direction of travel of the row unit. A first gauge wheel assembly is configured to be mounted to a selected one of the front gauge wheel mounting location and the rear gauge wheel mounting location.

In another embodiment, a row unit for an agricultural implement includes a first gauge wheel mounting location and a second gauge wheel mounting location. The second gauge wheel mounting location is positioned forward of the first gauge wheel mounting location, relative to the direction of travel of the row unit.

In a further embodiment, a row unit for an agricultural implement includes a frame assembly having a front mounting location configured to couple a first gauge wheel assembly having a pull-type gauge wheel to the frame assembly and a rear mounting location configured to couple a second gauge wheel assembly having a push-type gauge wheel to the frame assembly. Each gauge wheel is configured to control a planting depth of the row unit.

DRAWINGS

These and other features, aspects, and advantages of the present invention will become better understood when the following detailed description is read with reference to the accompanying drawings in which like characters represent like parts throughout the drawings, wherein:

FIG. 5 is an exploded view of the portion of the row unit of FIG. 4.

DETAILED DESCRIPTION

Figure 1:
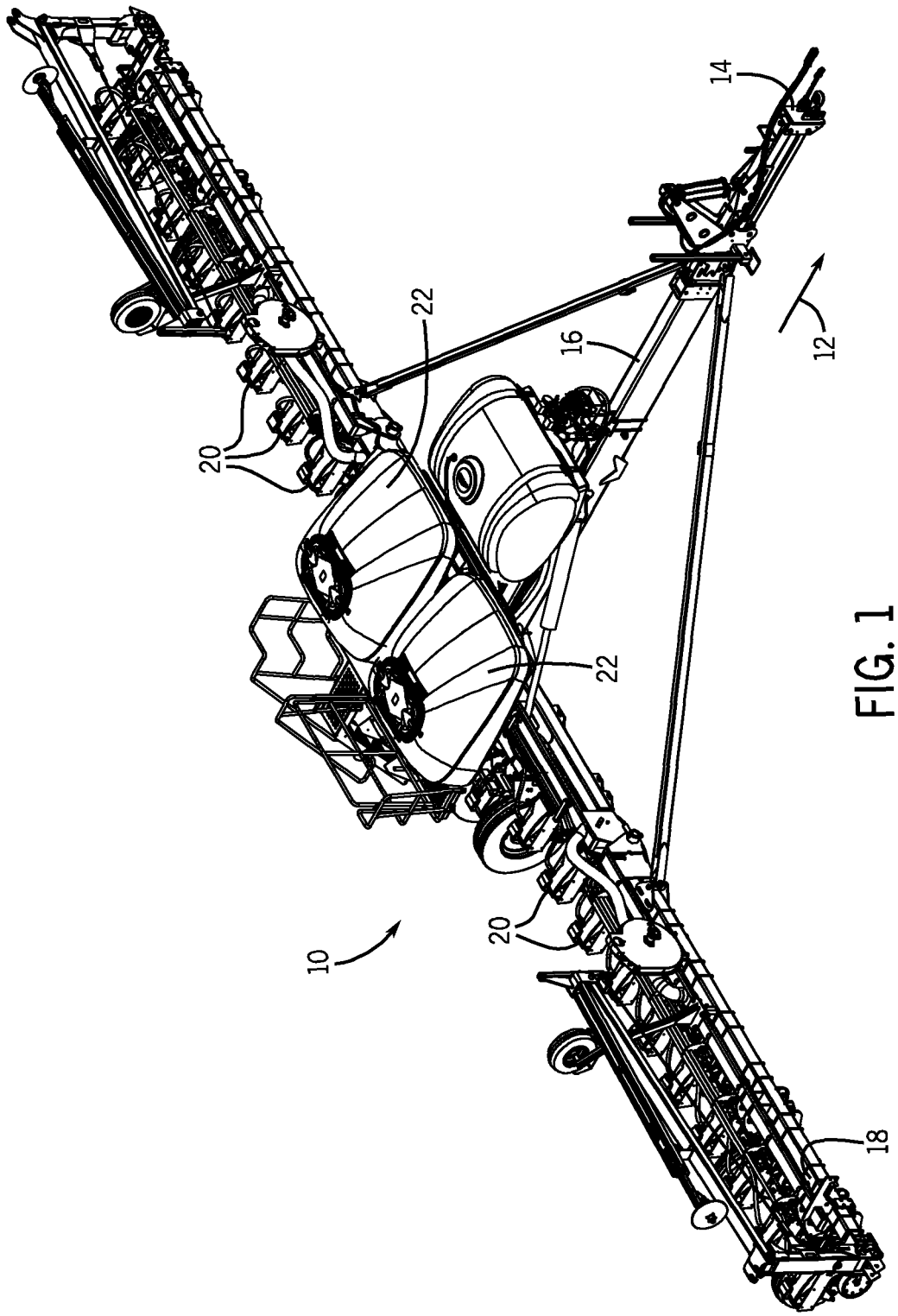
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes at least one gauge wheel and an opener disc. The gauge wheel(s) may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 4 to 54 row units, or more. In addition, the spacing between row units may be particularly selected based on the type of crop being planted. For example, the row units may be spaced 30 inches from one another for planting corn, and 15 inches from one another for planting soy beans.

In certain embodiments, the row units 20 include a frame assembly having multiple mounting locations for the gauge wheels. Specifically, the frame assembly may include a front gauge wheel position and a rear gauge wheel position, such that an operator may choose a preferred mounting location on the row units 20 for the gauge wheels. Having multiple mounting locations for the gauge wheels facilitates operator customization to accommodate variation in planting conditions (e.g., crop selection, geographical region, weather conditions, etc.). Thus, the operator may arrange the gauge wheels to obtain an agronomic advantage. Further, having multiple mounting locations for the gauge wheels may enable the operator to mount additional tools to the row units 20, thereby enabling further customization of the row units 20.

Figure 2:
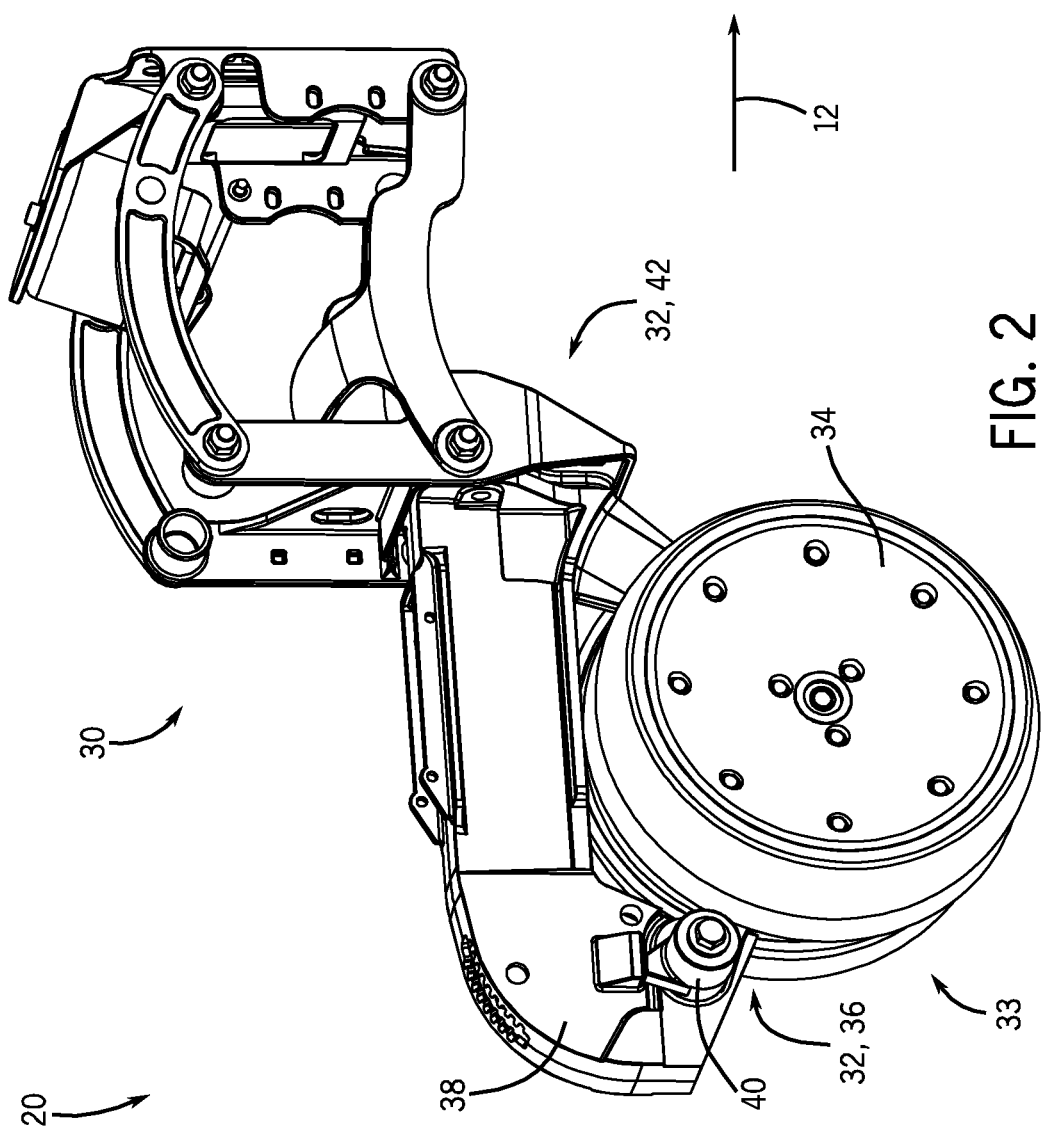
FIG. 2 is a perspective view of an embodiment of a portion of a row unit having a frame assembly with multiple gauge wheel mounting locations and a set of gauge wheel assembly mounted at a rear mounting location.

FIG. 2 is a perspective view of an embodiment of a portion of the row unit 20 having a frame assembly 30 with multiple gauge wheel mounting locations 32, and a gauge wheel assembly 33 mounted at a rear mounting location 36. The gauge wheel assembly 33 may include a single or multiple gauge wheels 34. When mounted at the rear mounting location 36, the gauge wheel assembly 33 may include push-type gauge wheels, as they are pushed forward by the motion of the frame assembly 30 in the direction of travel 12. The rear mounting location 36 is located on a longitudinal support 38 of the frame assembly 30. However, in other embodiments, the rear mounting location 36 may be located on a different portion of the frame assembly 30. The longitudinal support 38 supports the gauge wheels 34 during operation of the row unit 20. The gauge wheel assembly 33 includes arms 40 that couple the gauge wheels 34 to the longitudinal support 38. In the illustrated embodiment, two gauge wheels 34 are used, and each gauge wheel 34 is mounted to the longitudinal support 38 via an independent arm 40. In other embodiments, the arms 40 may be included as part of the longitudinal support 38 and/or the gauge wheels 34 may be mounted to the longitudinal support 38 via a single arm 40. The arms 40 are independently and rotatably coupled to the longitudinal support 38, such that the gauge wheels 34 may move separately from one another.

The frame assembly 30 also includes a front mounting location 42 for mounting the gauge wheel assembly 33. As may be appreciated, mounting the gauge wheel assembly 33 at the rear mounting location 36 may leave the front mounting location 42 unused. Accordingly, the front mounting location 42 may be used to accommodate additional tools, components, features, and so forth for the row unit 20. Further, the longitudinal support 38 may accommodate additional tools, such as opening discs, closing discs, a press wheel, or the like. As such, the operator is capable of customizing the row units 20 based on planting conditions (e.g., soil conditions, planting depth, crop type, etc.), thereby improving the efficiency of planting. Improved efficiency may improve crop yields and/or profits.

Figure 3:
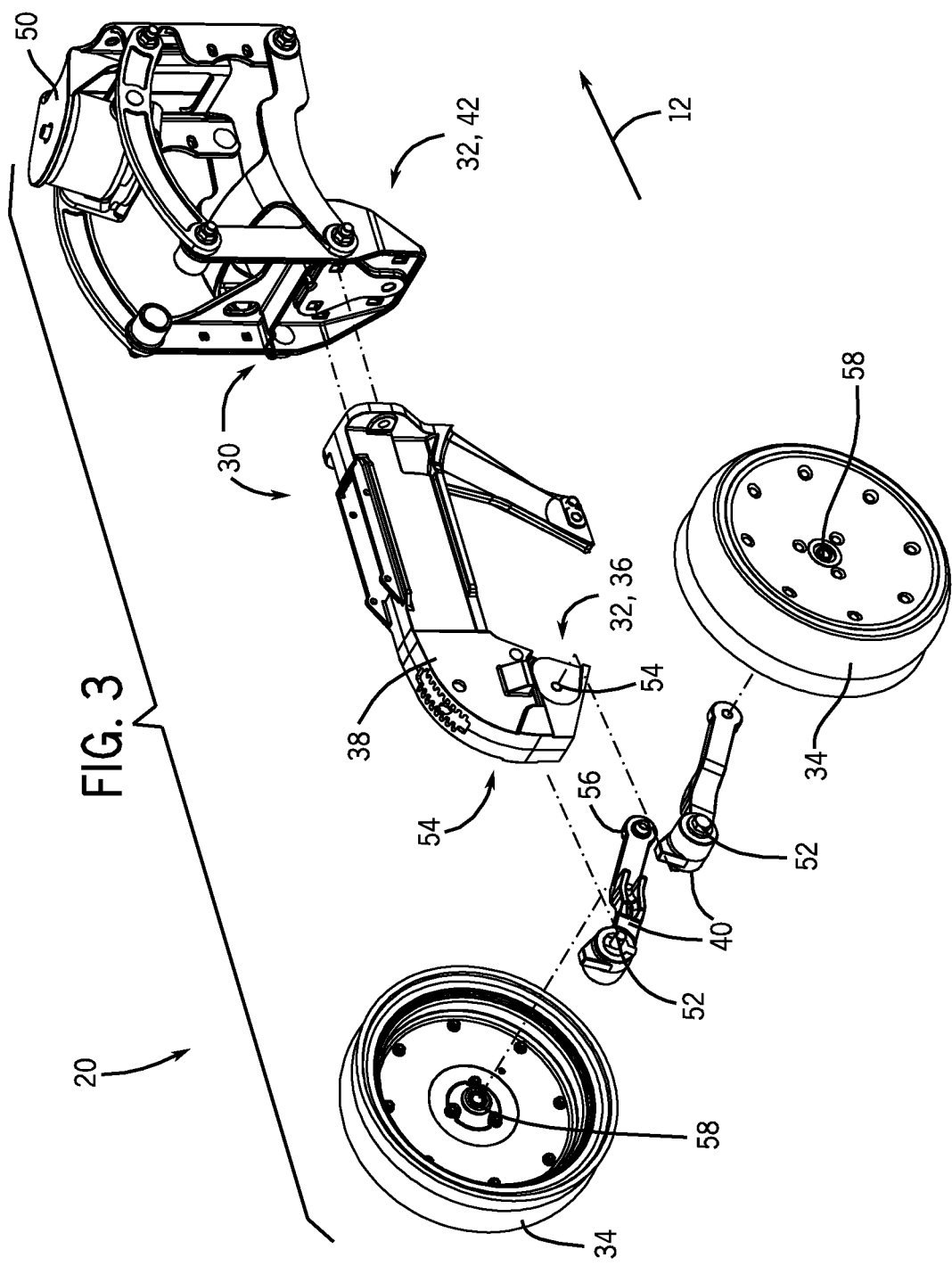
FIG. 3 is an exploded view of the portion of the row unit of FIG. 2.

FIG. 3 is an exploded view of the portion of the row unit 20 of FIG. 2 having the gauge wheel assembly 33 disposed at the rear mounting location 36. As depicted, the frame assembly 30 includes multiple distinct parts, such as the longitudinal support 38 and a parallel linkage 50. The parallel linkage 50 couples the frame assembly 30 to the tool bar 18 of the implement 10. The longitudinal support 38 includes the rear mounting location 36. Further, in the illustrated embodiment, the parallel linkage 50 includes the front mounting location 42. Accordingly, the front mounting location 42 is disposed forward of the rear mounting location 36 with respect to the direction of travel 12 of the agricultural implement 10.

Particularly, the arms 40 are rotatably coupled to the longitudinal support 38 at the rear mounting location 36 using fasteners 52 inserted into openings 54. The gauge wheels 34 are rotatably coupled to openings 56 of the arms 40 using fasteners 58. The fasteners 52 and 58 may be any suitable fasteners, such as bolts, pins, screws, etc. In this configuration, each gauge wheel 34 may rotate relative to the longitudinal support 38 and move in a vertical direction independently of one another. Further, each gauge wheel 34 may be positioned relative to the soil to control the depth of a seed trench, such as those formed by opening discs. Moreover, the gauge wheels 34 may rotate about a rotational axis extending through the fasteners 58 and the openings 56, and being substantially perpendicular to the direction of travel 12 of the agricultural implement 10.

Figure 4:
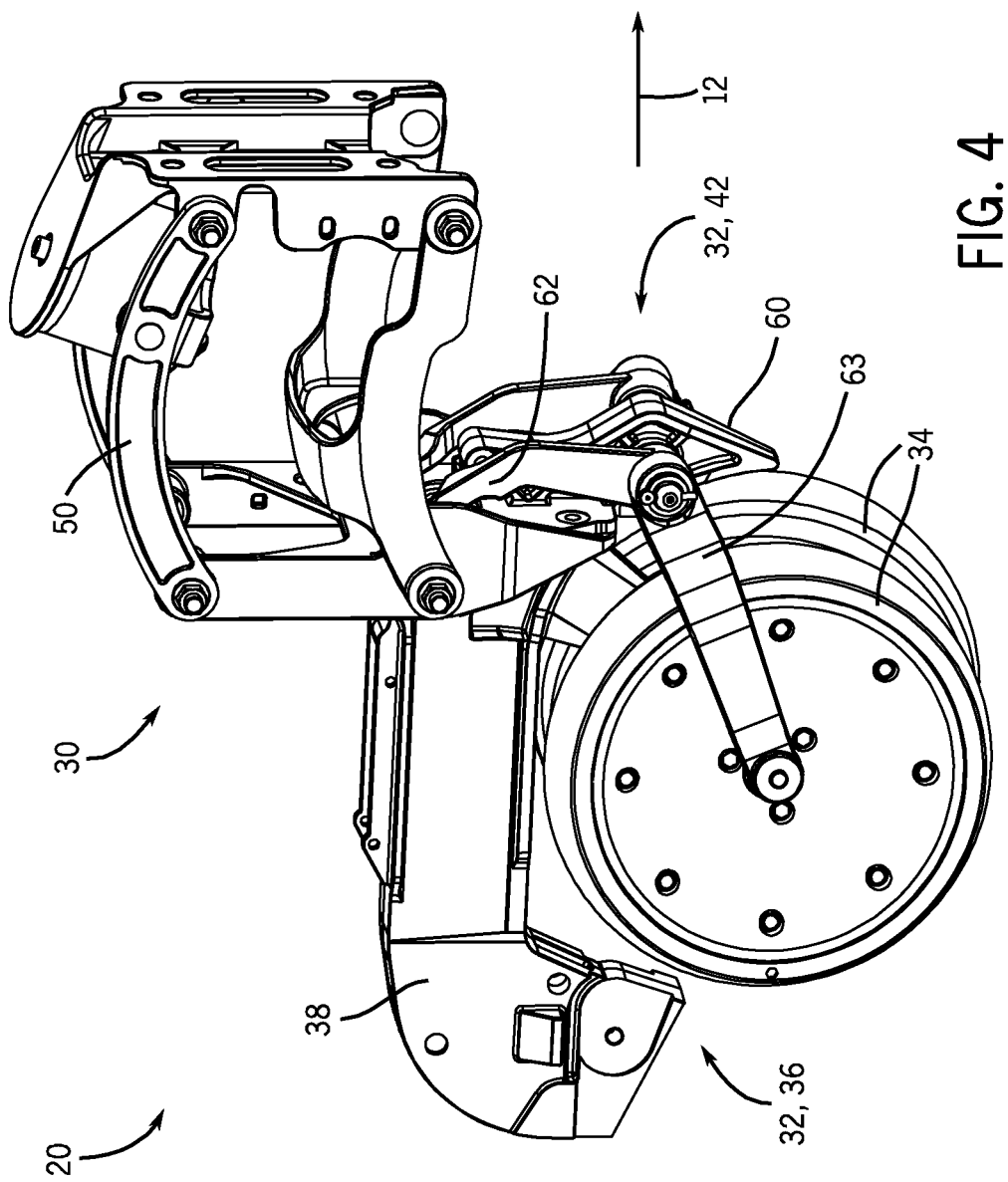
FIG. 4 is a perspective view of an embodiment of a portion of a row unit having a frame assembly with multiple gauge wheel mounting locations and a set of gauge wheel assembly mounted at a front mounting location.

FIG. 4 is a perspective view of an embodiment of a portion of the row unit 20 having the frame assembly 30 with multiple gauge wheel mounting locations 32, and the gauge wheel assembly 33 mounted at the front mounting location 42. When mounted at the front mounting location 42, the gauge wheel assembly 64 may include pull-type gauge wheels, as the gauge wheels 34 are pulled in the direction of travel 12 by the frame assembly 30. The front mounting location 42 is located on the parallel linkage 50 of the frame assembly 30. However, in other embodiments, the front mounting location 42 may be located on a different portion of the frame assembly 30. A bracket 60 couples the gauge wheel assembly 64 to the parallel linkage 50. Although depicted as having two gauge wheels 34 mounted at the front location 42, other embodiments may include a gauge wheel assembly 64 having fewer or more gauge wheels 34.

In the illustrated embodiment, the frame assembly 30 includes the longitudinal support 38, the parallel linkage 50, the bracket 60, and supports 62. Particularly, the bracket 60 is mounted to the parallel linkage 50, the supports 62 extend vertically upward relative to the bracket 60, and the arms 63 at the gauge wheel assembly 64 extend rearward, relative to the bracket 60 and the supports 62. Each gauge wheel 34 is coupled to a respective arm 63, such that the gauge wheels 34 may move independently of one another. By mounting the gauge wheels 34 at the front mounting location 42, depth control of the opening discs may be improved, as compared to the rear mounting location 36, and additional components may be mounted at the rear mounting location 36. The multiple mounting locations 32 may facilitate customization of the row unit 20, thereby improving the operability of the agricultural implement 10 for a variety of planting conditions.

FIG. 5 is an exploded view of the portion of the row unit 20 of FIG. 4 having the gauge wheel assembly 64 disposed at the front mounting location 42. As depicted, the bracket 60 is coupled to the front surface of the parallel linkage 50, and the longitudinal support 38 is coupled to the back surface of the parallel linkage 50. The bracket 60 may only be used when the gauge wheel assembly 64 is disposed at the front mounting location 42. For example, when the gauge wheel assembly 33 is mounted to the rear mounting location 36, the bracket 60 may be removed to reduce weight.

When the gauge wheel assembly 64 is positioned at the front mounting location 42, the arms 63 are coupled to the bracket 60 and the supports 62. Bolts are used to secure the bracket 60 to the parallel linkage 50, providing rigidity and structural support to the frame assembly 30.

The row units 20 may include a frame assembly 30, which has multiple mounting locations 32 for gauge wheels 34. Specifically, the longitudinal support 38 of the frame assembly 30 may include the rear mounting location 36, and the parallel linkage 50 of the frame assembly 30 may include the front mounting location 42. As such, the operator may choose a preferred mounting location 32 for the gauge wheels 34 on the row units 20. Having multiple mounting locations 32 for the gauge wheels 34 facilitates operator customization to accommodate variation in planting conditions (e.g., crop selection, geographical region, weather conditions, etc.). Thus, the operator may arrange the gauge wheels 34 to obtain an agronomic advantage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A row unit for an agricultural implement, comprising:
   a frame assembly comprising a first front gauge wheel mounting location and a first rear gauge wheel mounting location, wherein the first front gauge wheel mounting location is forward of the first rear gauge wheel mounting location, relative to a direction of travel of the row unit; and
   a first gauge wheel assembly configured to be mounted to a selected one of the first front gauge wheel mounting location and the first rear gauge wheel mounting location.

2. The row unit of claim 1, comprising a second gauge wheel assembly configured to be mounted to a second front gauge wheel mounting location while the first gauge wheel assembly is mounted to the first front gauge wheel mounting location, and to be mounted to a second rear gauge wheel mounting location while the first gauge wheel assembly is mounted to the first rear gauge wheel mounting location.

3. The row unit of claim 1, wherein the frame assembly comprises a longitudinal support having the first rear gauge wheel mounting location.

4. The row unit of claim 3, wherein the frame assembly comprises a bracket having the first front gauge wheel mounting location, the bracket being coupled to the longitudinal support.

5. The row unit of claim 4, wherein the frame assembly comprises supports configured to support the first gauge wheel assembly.

6. The row unit of claim 1, wherein the first gauge wheel assembly is mounted to the first front gauge wheel mounting location, and the first gauge wheel assembly includes a gauge wheel positioned rearward of a gauge wheel arm pivot axis.

7. The row unit of claim 1, wherein the first gauge wheel assembly is mounted to the rear gauge wheel mounting location, and the first gauge wheel assembly includes a gauge wheel positioned forward of a gauge wheel arm pivot axis.

8. The row unit of claim 1, wherein the first gauge wheel assembly comprises an arm configured to mount a first gauge wheel to the selected one of the first front gauge wheel mounting location and the first rear gauge wheel mounting location.

9. The row unit of claim 1, comprising a bolt or pin coupling the first gauge wheel assembly to the frame assembly.

10. A row unit for an agricultural implement, comprising:
    a frame assembly, comprising:
       a front gauge wheel mounting location configured to couple a first gauge wheel assembly having a gauge wheel positioned rearward of a first gauge wheel arm pivot axis to the frame assembly; and
       a rear gauge wheel mounting location configured to couple a second gauge wheel assembly having a gauge wheel positioned forward of a second gauge wheel arm pivot axis to the frame assembly;
    wherein each gauge wheel is configured to control a planting depth of the row unit.

11. The row unit of claim 10, wherein the first gauge wheel assembly comprises a pair of gauge wheels positioned rearward of the first gauge wheel arm pivot axis.

12. The row unit of claim 10, wherein the second gauge wheel assembly comprises a pair of gauge wheels positioned forward of the second gauge wheel arm pivot axis.

13. The row unit of claim 10, wherein the frame assembly comprises a bracket having the front gauge wheel mounting location, the bracket being coupled to a longitudinal support.

14. The row unit of claim 10, wherein the first and second gauge wheel assemblies comprise a pair of arms configured to mount the pair of gauge wheels to the frame assembly.

* * * * *